(12) United States Patent
Kim et al.

(10) Patent No.: US 8,301,136 B2
(45) Date of Patent: Oct. 30, 2012

(54) METHOD FOR RESTRICTING COMMUNICATING SERVICE IN ROAMING IN MULTI MODE TERMINAL AND APPARATUS THEREFOR

(75) Inventors: Wooyol Kim, Gwangmyeong-si (KR); Kwanwoo Park, Seoul (KR); Seungjin Ahn, Gunpo-si (KR); Jinju Kim, Bucheon-si (KR); Joondong Lee, Seoul (KR); Ejae Kim, Incheon (KR); Sangwoo Kim, Seoul (KR); Jonghyun Jin, Seoul (KR); Heechul Yoo, Gunpo-si (KR); Kazumasa Nitta, Tokyo (KR); Atsuto Miyata, Kanagawa (KR); Kazuoki Ichikawa, Tokyo (KR)

(73) Assignees: LG Electronics Inc., Seoul (KR); NTT DoCoMo, Inc., Tokyo (JP)

( * ) Notice: Subject to any disclaimer, the term of this patent is extended or adjusted under 35 U.S.C. 154(b) by 0 days.

(21) Appl. No.: 13/154,534

(22) Filed: Jun. 7, 2011

(65) Prior Publication Data

US 2011/0300844 A1     Dec. 8, 2011

Related U.S. Application Data

(60) Provisional application No. 61/352,406, filed on Jun. 8, 2010.

(30) Foreign Application Priority Data

May 6, 2011   (KR) .................. 10-2011-0043004

(51) Int. Cl.
*H04W 4/00*     (2009.01)

(52) U.S. Cl. ............... 455/432.1; 455/422.1; 455/550.1; 455/553.1; 455/418; 455/425
(58) Field of Classification Search ............... 455/432.1, 455/422.1, 550.1, 553.1, 418, 425
See application file for complete search history.

(56) References Cited

U.S. PATENT DOCUMENTS

| | | | |
|---|---|---|---|
| 6,144,855 A * | 11/2000 | Slovin ........................ | 455/432.1 |
| 2007/0173251 A1* | 7/2007 | Vikberg et al. ............... | 455/428 |
| 2012/0077495 A1* | 3/2012 | Kim et al. ................... | 455/435.1 |
| 2012/0149373 A1* | 6/2012 | Tian et al. .................... | 455/436 |

* cited by examiner

*Primary Examiner* — Ajit Patel
*Assistant Examiner* — Khai M Nguyen
(74) *Attorney, Agent, or Firm* — Birch, Stewart, Kolasch & Birch, LLP

(57) ABSTRACT

A method for performing roaming in a dual mode terminal, which includes a first wireless communication module corresponding to a first communication network and a second wireless communication module corresponding to a second communication network, is disclosed. The method comprises acquiring a public land mobile network (PLMN) identifier by camping on the first communication network; determining whether connection to the first communication network is roaming by comparing roaming decision information included in the PLMN identifier with roaming decision information stored in the dual mode terminal; turning off the second wireless communication module if it is determined that connection to the first communication network is roaming; and transmitting and receiving a signal to and from the first communication network.

12 Claims, 11 Drawing Sheets

E-UMTS (a) control-plane protocol stack (b) user-plane protocol stack (a)

(b)

METHOD FOR RESTRICTING COMMUNICATING SERVICE IN ROAMING IN MULTI MODE TERMINAL AND APPARATUS THEREFOR

This application claims the benefit of the Korean Patent Application No. 10-2011-0043004, filed on May 6, 2011, which is hereby incorporated by reference as if fully set forth herein.

This application also claims the benefit of U.S. Provisional Application Ser. No. 61/352,406, filed on Jun. 8, 2010, the content of which is hereby incorporated by reference herein in their entirety.

BACKGROUND OF THE INVENTION

1. Field of the Invention

The present invention relates to a multi mode terminal, and more particularly, to a method for restricting a communicating service in roaming in a multi mode terminal and an apparatus therefor.

2. Discussion of the Related Art

A $3^{rd}$ generation partnership project long term evolution (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS system is an evolved version of the conventional UMTS system, and its basic standardization is in progress under the 3rd Generation Partnership Project (3GPP). The E-UMTS may also be referred to as a Long Term Evolution (LTE) system. For details of the technical specifications of the UMTS and E-UMTS, refer to Release 7 and Release 8 of "3rd Generation Partnership Project; Technical Specification Group Radio Access Network".

Referring to FIG. 1, the E-UMTS includes a User Equipment (UE) 120, base stations (eNode B and eNB) 110a and 110b, and an Access Gateway (AG) which is located at an end of a network (E-UTRAN) and connected to an external network. The base stations can simultaneously transmit multiple data streams for a broadcast service, a multicast service and/or a unicast service.

One or more cells may exist for one base station. One cell is set to one of bandwidths of 1.25, 2.5, 5, 10, and 20 Mhz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify time and frequency domains to which data will be transmitted and information related to encoding, data size, hybrid automatic repeat and request (HARQ). Also, the base station transmits uplink (UL) scheduling information of uplink data to the corresponding user equipment to notify time and frequency domains that can be used by the corresponding user equipment, and information related to encoding, data size, HARQ. An interface for transmitting user traffic or control traffic can be used between the base stations. A Core Network (CN) may include the AG and a network node or the like for user registration of the UE. The AG manages mobility of a UE on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology is required for competitiveness in the future. In this respect, reduction of cost per bit, increase of available service, use of adaptable frequency band, simple structure, open type interface, proper power consumption of user equipment, etc. are required.

SUMMARY OF THE INVENTION

Accordingly, the present invention is directed to a method for restricting a communicating service in roaming in a multi mode terminal and an apparatus therefor, which substantially obviate one or more problems due to limitations and disadvantages of the related art.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, in a method for performing roaming in a dual mode terminal, which includes a first wireless communication module corresponding to a first communication network and a second wireless communication module corresponding to a second communication network, the method comprises acquiring a public land mobile network (PLMN) identifier by camping on the first communication network; determining whether connection to the first communication network is roaming by comparing roaming decision information included in the PLMN identifier with roaming decision information stored in the dual mode terminal; turning off the second wireless communication module if it is determined that connection to the first communication network is roaming; and transmitting and receiving a signal to and from the first communication network.

Preferably, the method further comprises determining whether the second wireless communication module is being operated if connection to the first communication network is not roaming; and resuming the operation of the second wireless communication module if the second wireless communication module is not being operated.

In another aspect of the present invention, a dual mode terminal in a wireless communication system comprises a first wireless communication module for transmitting and receiving a signal to and from a first communication network; a second wireless communication module for transmitting and receiving a signal to and from a second communication network; a memory module storing roaming decision information; and a processor processing the signal received from the first communication network and the signal received from the second communication network, wherein the processor acquires a public land mobile network (PLMN) identifier by camping on the first communication network, determines whether connection to the first communication network is roaming by comparing roaming decision information included in the PLMN identifier with roaming decision information stored in the dual mode terminal, and turning off the second wireless communication module if it is determined that connection to the first communication network is roaming.

Preferably, the processor determines whether the second wireless communication module is being operated if connection to the first communication network is not roaming, and resumes the operation of the second wireless communication module if the second wireless communication module is not being operated.

In this case, the roaming decision information is a mobile country code (MCC) or combination of a mobile country code (MCC) and a mobile network code (MNC).

Specifically, the first communication network is a universal mobile telecommunications system (UMTS) communication network, and the second communication network is a long term evolution (LTE) communication network.

Meanwhile, a system providing a roaming service to the dual mode terminal includes the first communication network only.

According to the embodiments of the present invention, the dual mode terminal of the wireless communication system can effectively restrict the service provided from the network, which is not verified, during roaming.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. Wherever possible, the same reference numbers will be used throughout the drawings to refer to the same or like parts.

Hereinafter, structures, operations, and other features of the present invention will be understood readily by the preferred embodiments of the present invention, examples of which are illustrated in the accompanying drawings. Embodiments described later are examples in which technical features of the present invention are applied to 3GPP system.

Figure 1:
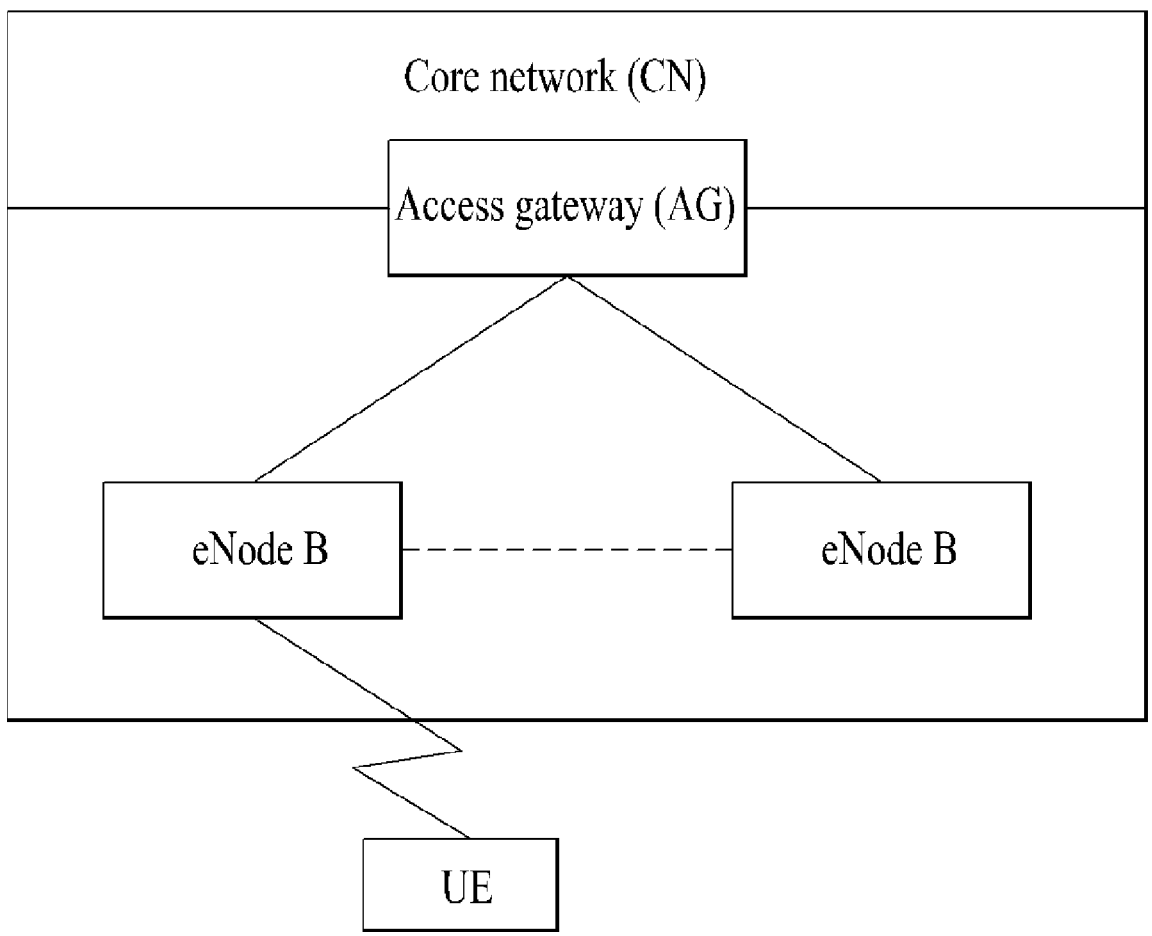
FIG. 1 is a diagram illustrating a network structure of an Evolved Universal Mobile Telecommunications System (E-UMTS) which is an example of a mobile communication system.
Figure 2:
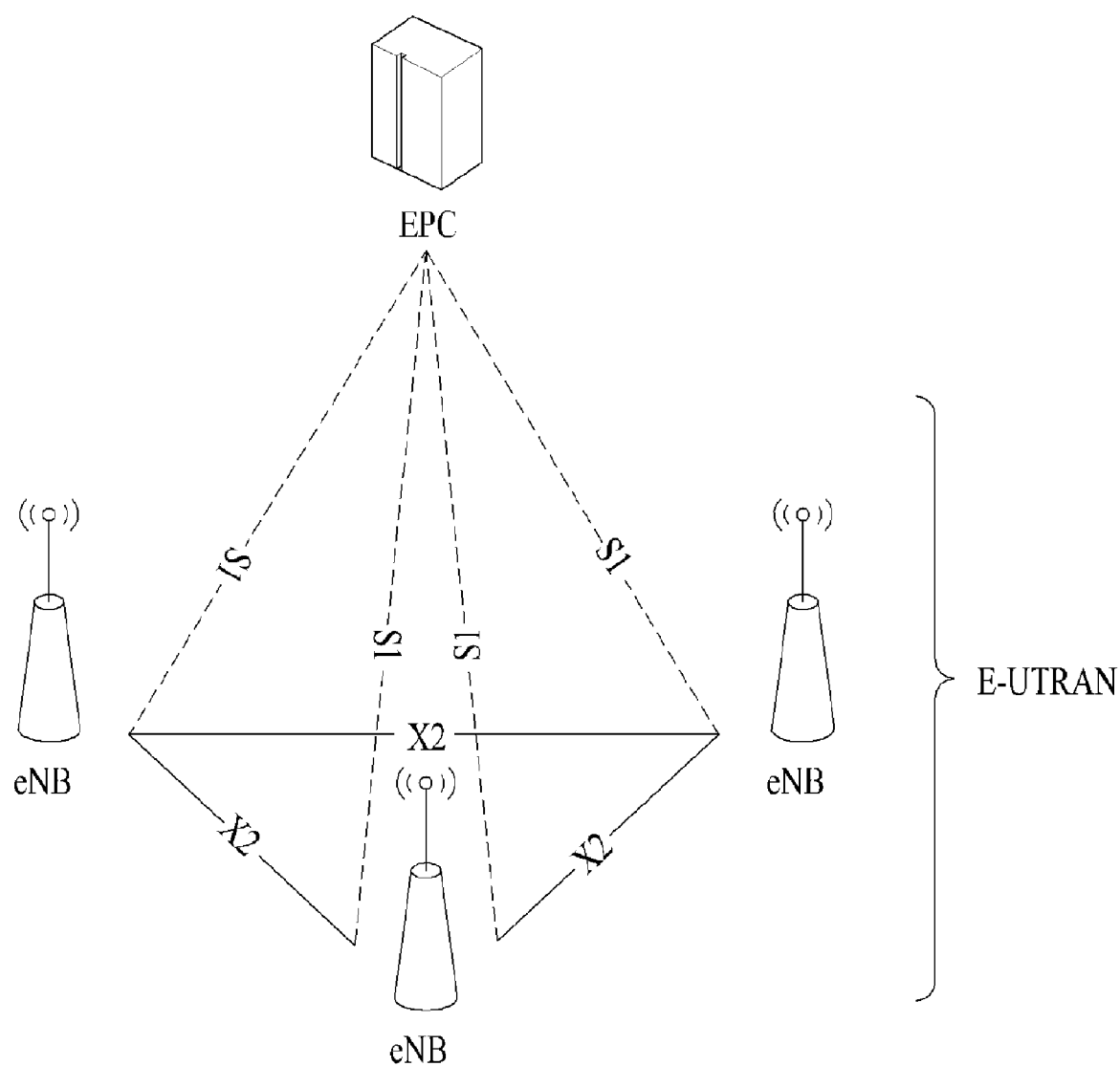
FIG. 2 is a diagram conceptionally illustrating a network structure of an Evolved Universal Terrestrial Radio Access Network (E-UTRAN)

FIG. 2 is a diagram conceptionally illustrating a network structure of an Evolved Universal Terrestrial Radio Access Network (E-UTRAN).

Referring to FIG. 2, the E-UTRAN system is a system evolving from the conventional UTRAN system and. The E-UTRAN includes cells (eNB) connected with one another through X2 interface. Each of eNBs is connected with a user equipment through a radio interface and connected with an Evolved Packet Core (EPC) through S1 interface.

The EPC includes a mobility management entity (MME), a serving-gateway (S-GW), and a packet data network-gateway (PDN-GW). The MME includes access information of the user equipment or ability information of the user equipment, wherein the access information or the ability information is mainly used for mobility management of the user equipment. The S-GW is a gateway having the E-UTRAN as an end point, and the PDN-GW is a gateway having a PDN as an end point.

Figure 3:
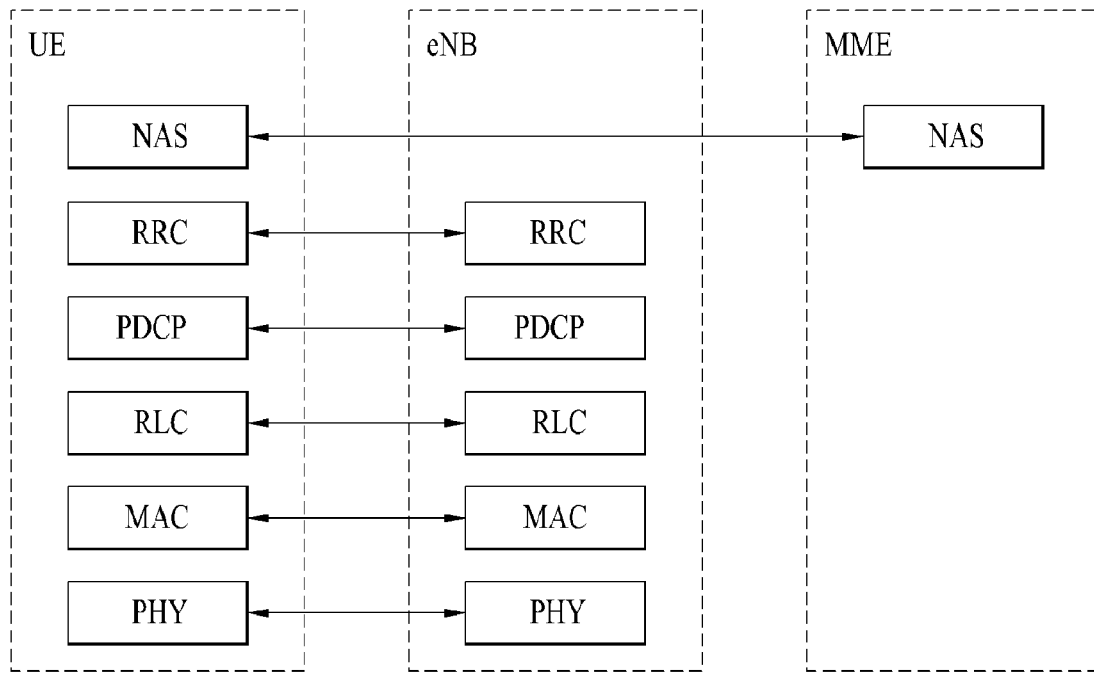
FIG. 3 is a diagram illustrating structures of a control plane and a user plane of a radio interface protocol between a user equipment and E-UTRAN based on the 3GPP radio access network standard.
Figure 3:
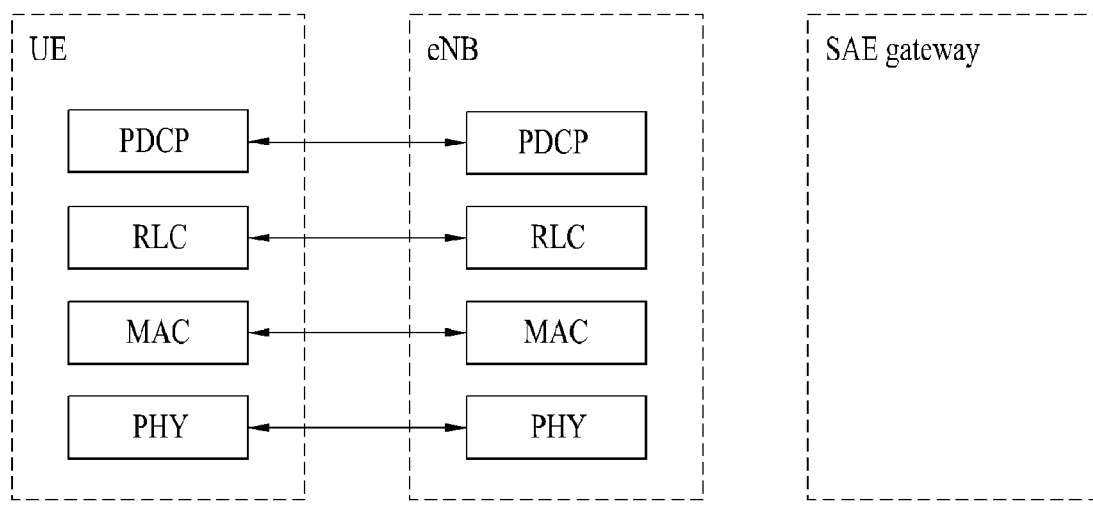

FIG. 3 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel. The physical layer is connected to a medium access control layer above the physical layer via a transport channel. Data are transferred between the medium access control layer and the physical layer via the transport channel. Data are transferred between one physical layer of a transmitting side and the other physical layer of a receiving side via the physical channel. The physical channel uses time and frequency as radio resources. Specifically, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control layer of the second layer provides a service to a radio link control (RLC) layer above the MAC layer via logical channels. The RLC layer of the second layer supports reliable data transfer. The RLC layer may be implemented as a functional block inside the MAC layer. In order to effectively transmit data using IP packets (e.g., IPv4 or IPv6) within a radio interface having a narrow bandwidth, a packet data convergence protocol (PDCP) layer of the second layer performs header compression to reduce the size of unnecessary control information.

A radio resource control (hereinafter, abbreviated as 'RRC') layer located on a lowest part of the third layer is defined in the control plane only. The RRC layer is associated with configuration, re-configuration and release of radio bearers (hereinafter, abbreviated as 'RBs') to be in charge of controlling the logical, transport and physical channels. In this case, the RB means a service provided by the second layer for the data transfer between the user equipment and the network. To this end, the RRC layer of the user equipment and the network exchanges RRC message with each other.

One cell constituting a base station (eNB) is established at one of bandwidths of 1.25, 2.5, 5, 10, 15, and 20 Mhz and provides a downlink or uplink transmission service to several user equipments. At this time, different cells can be established to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH).

Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 4:
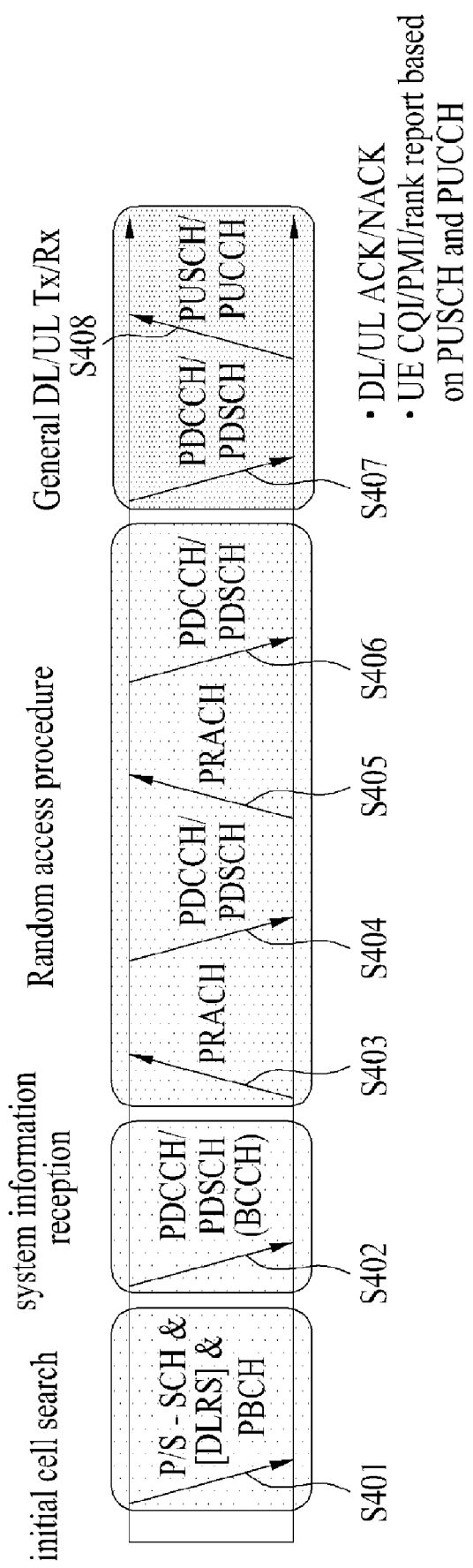
FIG. 4 is a diagram illustrating physical channels used in a 3GPP system and a general method for transmitting a signal using the physical channel.

FIG. 4 is a diagram illustrating physical channels used in a 3GPP system and a general method for transmitting a signal using the physical channel.

The user equipment performs initial cell search such as synchronizing with the base station when it newly enters a cell or the power is turned on (S401). To this end, the user equipment synchronizes with the base station by receiving a primary synchronization channel (P-SCH) and a secondary synchronization channel (S-SCH) from the base station, and acquires information of cell ID, etc. Afterwards, the user equipment can acquire broadcast information within the cell by receiving a physical broadcast channel from the base station. Meanwhile, the user equipment can identify the status of a downlink channel by receiving a downlink reference signal (DL RS) in the initial cell search step.

The user equipment which has finished the initial cell search can acquire more detailed system information by receiving a physical downlink control channel (PDSCH) in accordance with a physical downlink control channel (PDCCH) and information carried in the PDCCH (S402).

Meanwhile, if the user equipment initially accesses the base station, or if there is no radio resource for signal transmission, the user equipment performs a random access procedure (RACH) for the base station (S403 to S406). To this end, the user equipment transmits a preamble of a specific sequence through a random physical random access channel (PRACH) (S403 and S405), and receives a response message to the preamble through the PDCCH and a PDSCH corresponding to the PDCCH (S404 and S406). In case of a contention based RACH, a contention resolution procedure can be performed additionally.

The user equipment which has performed the aforementioned steps receives the PDCCH/PDSCH (S407) and transmits a physical uplink shared channel (PUSCH) and a physical uplink control channel (PUCCH) (S408), as a general procedure of transmitting uplink/downlink signals. In particular, the user equipment receives downlink control information (DCI) through the PDCCH. The DCI includes control information such as resource allocation information on the user equipment and has different formats depending on its purpose of use.

Meanwhile, the control information transmitted from the user equipment to the base station or received from the base station to the user equipment through the uplink includes downlink/uplink ACK/NACK, a channel quality indicator (CQI), a precoding matrix index (PMI), and a rank indicator (RI). In case of the 3GPP LTE system, the user equipment transmits the aforementioned control information of CQI/PMI/RI through the PUSCH and/or the PUCCH.

Figure 5:
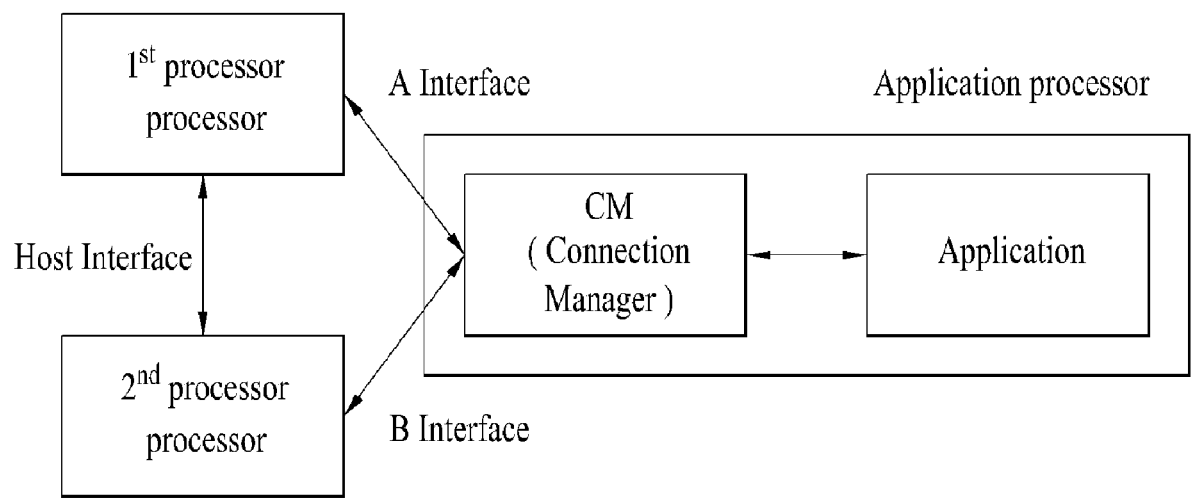
FIG. 5 is a diagram illustrating a structure of a dual mode user equipment.

FIG. 5 is a diagram illustrating a structure of a dual mode user equipment.

Referring to FIG. 5, the dual mode user equipment includes an application processor, a first modem processor for processing a signal received from a first communication network, and a second modem processor for processing a signal received from a second communication network. Preferably, the first communication network is a UMTS network which is a UTRAN system, and the second communication network is an LTE network, namely, E-UMTS network, which is an E-UTRAN.

The application processor may be configured as one module by hardware inside the dual mode user equipment, or may be included in a PC independently from the dual mode user equipment. Also, the application processor can include a connection manager (CM) for managing and controlling a connection status to the first communication network or the second communication network in accordance with a network condition.

In more detail, the CM serves to perform switching for transmitting and receiving data between an application and any one of the first modem processor and the second modem processor in accordance with the network connection status. In other words, if the dual mode user equipment is connected with the first communication network, the CM transmits and receives application data to and from interface A so that the first modem processor is connected with the application. If the dual mode user equipment is connected with the second communication network, the CM transmits and receives application data to and from interface B so that the second modem processor is connected with the application.

A host interface is located between the first modem processor and the second modem processor, and can be used for control signal transmission and data signal transmission between the respective processors.

Figure 6:
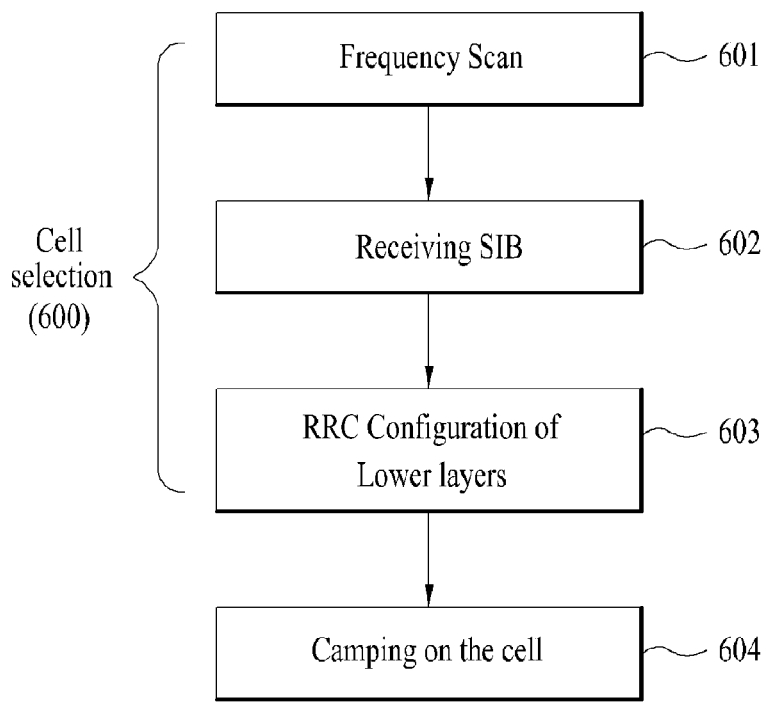
FIG. 6 is a diagram illustrating a procedure of selecting a public land mobile network (PLMN) according to the related art.

FIG. 6 is a diagram illustrating a procedure of selecting a public land mobile network (PLMN) according to the related art.

First of all, if the user equipment starts to be operated, i.e., if the user equipment is powered on, a NAS layer starts a procedure of selecting a public land mobile network (PLMN). Subsequently, the user equipment performs a cell selection procedure at step 600 to search a cell suitable for camp on. The cell selection procedure includes a frequency scan procedure, a system information block procedure and an RRC setup procedure of a lower layer.

In more detail, the user equipment first performs the frequency scan procedure at step 601 to acquire absolute radio frequency channel number (corresponding to UTRAN) or E-ARFCN (corresponding to E-UTRAN) of a cell for camp on. The frequency scan procedure includes a band scan for scanning all bands, and a system scan based on a band list stored in the user equipment.

After the frequency scan procedure is completed, the user equipment performs the system information block procedure at step 602. In more detail, the system information block procedure includes receiving a master information block and a system information block.

As the last step of the cell selection procedure, the user equipment configures parameters of lower layers of the RRC layer, for example, PHY layer, MAC layer, RLC layer and PDCP layer, at step 603.

If the cell selection procedure is completed, the user equipment camps on the corresponding cell at step 604. At this time, the NAS layer of the user equipment acquires a PLMN identifier of the corresponding cell from the RRC layer. The PLMN identifier includes a combination of a mobile country code (MCC) having a unique value per country and a mobile network code (MNC) having a unique value per network operator. Every worldwide communication network operator has a unique PLMN identifier due to the combination of the MCC and the MNC.

Figure 7:
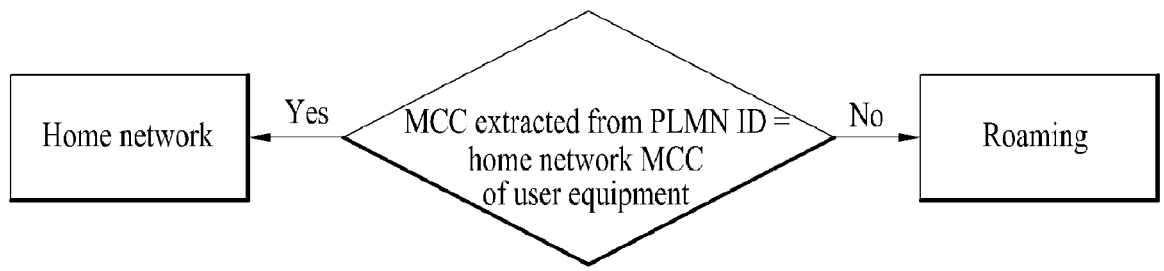
FIG. 7 is a diagram illustrating a general procedure of performing a roaming service.

FIG. 7 is a diagram illustrating a general procedure of performing a roaming service.

Referring to FIG. 7, the user equipment determines roaming by using a mobile country code (MCC) having a unique value per country and included in the PLMN ID.

In other words, the user equipment compares the MCC included in the PLMN ID with a unique MCC value stored therein whenever receiving the PLMN ID through the PLMN selection procedure. If the MCC included in the PLMN ID is the same as the unique MCC value stored in the user equipment, it is determined that the user equipment has accessed a home network. If not so, it is determined that the corresponding user equipment has been subjected to roaming.

Figure 8:
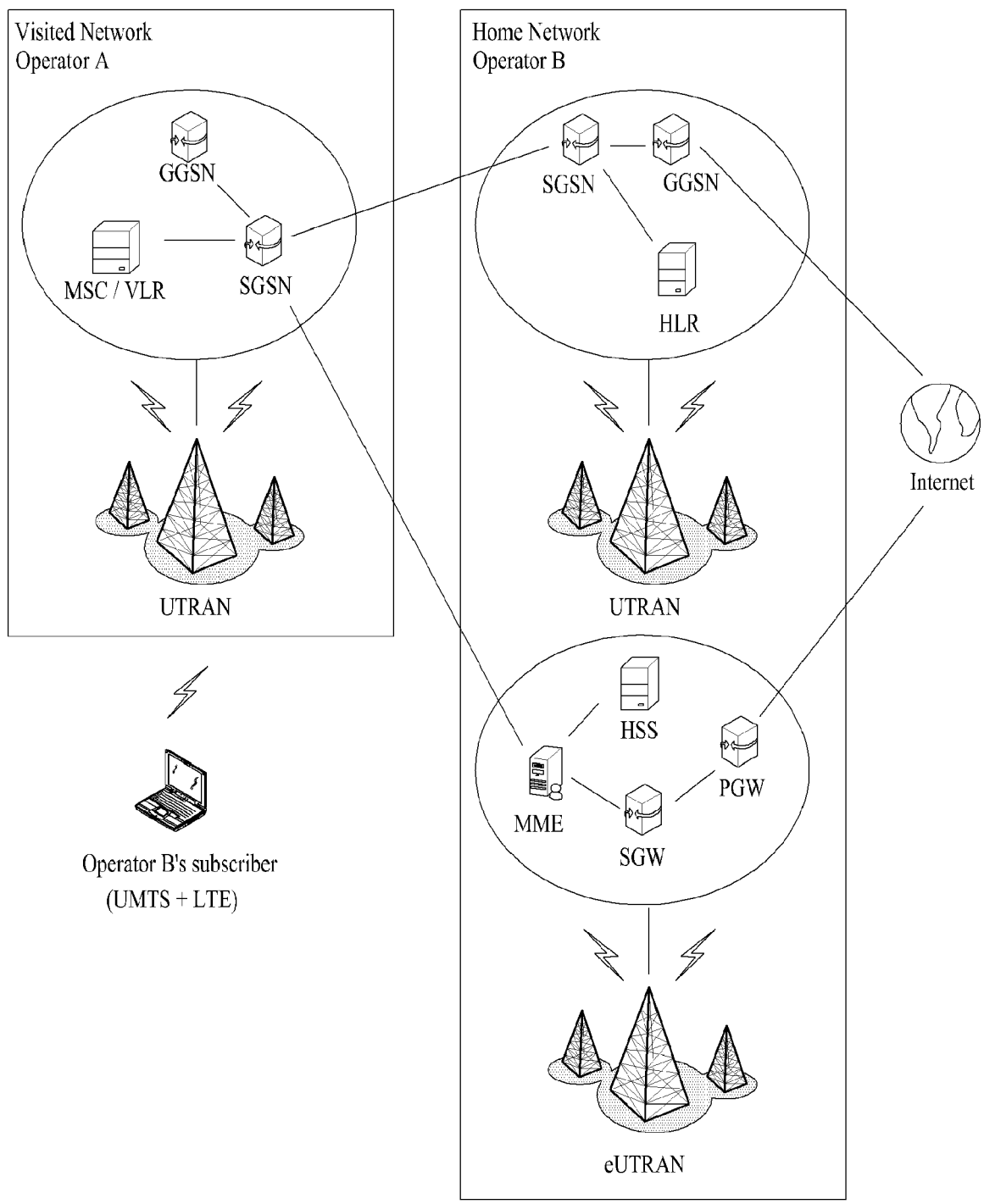
FIG. 8 is a diagram illustrating a problem of roaming technology according to the related art.

FIG. 8 is a diagram illustrating a problem of roaming technology according to the related art.

Referring to FIG. 8, a network of a network operator B includes a UTRAN, i.e., WCDMA network, and eUTRAN, i.e., LTE network. A network of a network operator A includes a WCDMA network only. Also, it is assumed that a subscriber user equipment of the network operator B is a dual mode user equipment that can perform communication with both a WCDMA network and an LTE network.

If the subscriber user equipment of the network operator B accesses the network of the network operator A through roaming, the network of the network operator B becomes a home network, and the network of the network operator A becomes a visited network. Since the network of the network operator A includes a WCDMA network only, the user equipment tries roaming by accessing the WCDMA network. In this case, an LTE module of the user equipment continues to be operated. For this reason, a problem occurs in that power consumption of the user equipment increases.

Figure 9:
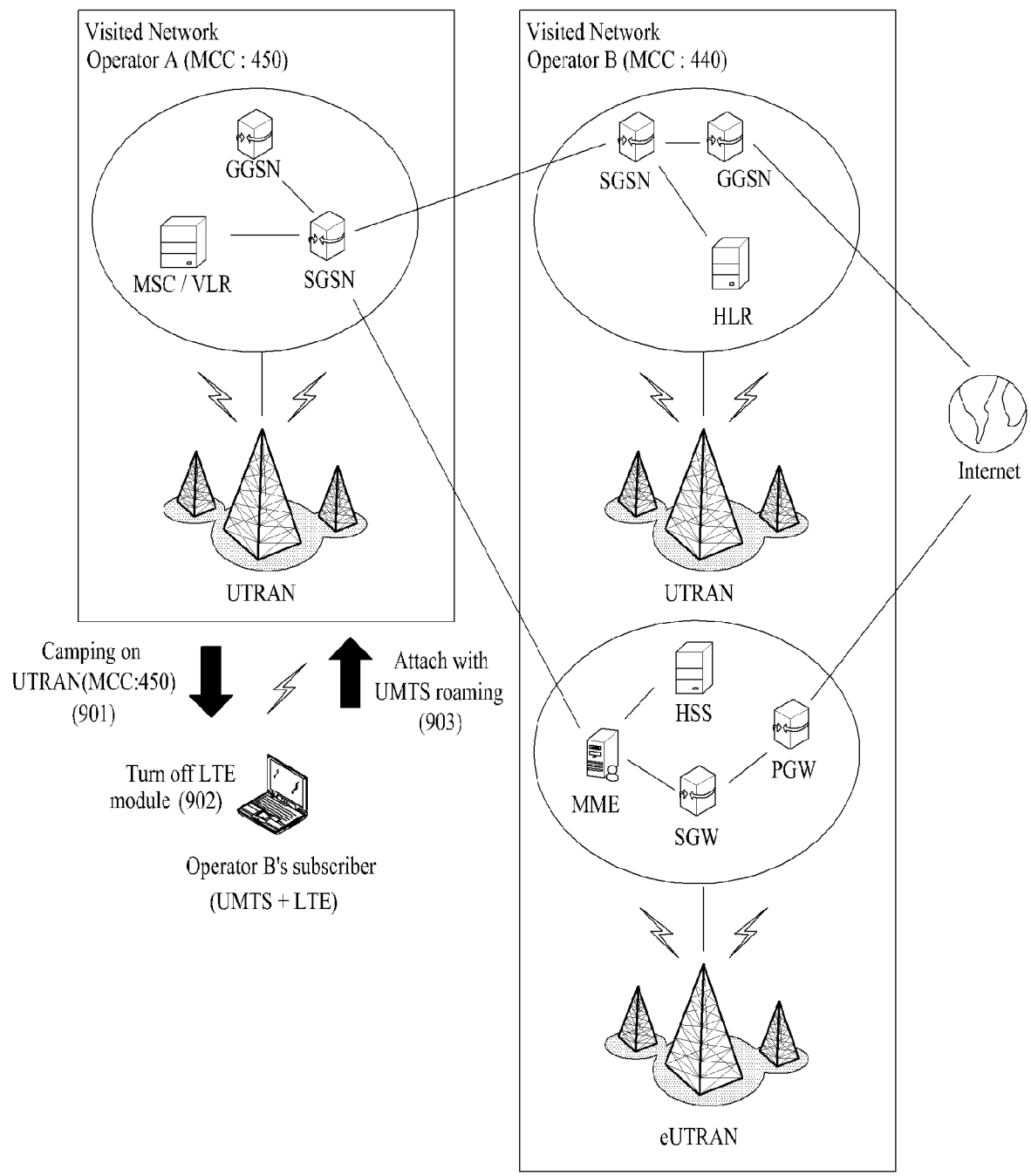
FIG. 9 is a conceptional view illustrating a roaming procedure according to the embodiment of the present invention.

FIG. 9 is a conceptional view illustrating a roaming procedure according to the embodiment of the present invention.

Referring to FIG. 9, the present invention suggests that the user equipment stops or resumes the operation of the LTE module by using the PLMN ID acquired during camp on to a specific cell. In more detail, if the subscriber user equipment of the network operator B performs camp on the UTRAN system of a country having no LTE network like the network operator A through roaming (step 901), it turns off the LTE module (step 902) and accesses the UMTS network of the UTRAN system (step 903).

Also, when the subscriber user equipment of the network operator B returns to the home network, it turns on the LTE module to receive a service from the LTE network. Hereinafter, the roaming procedure will be described in more detail with reference to FIG. 10.

Figure 10:
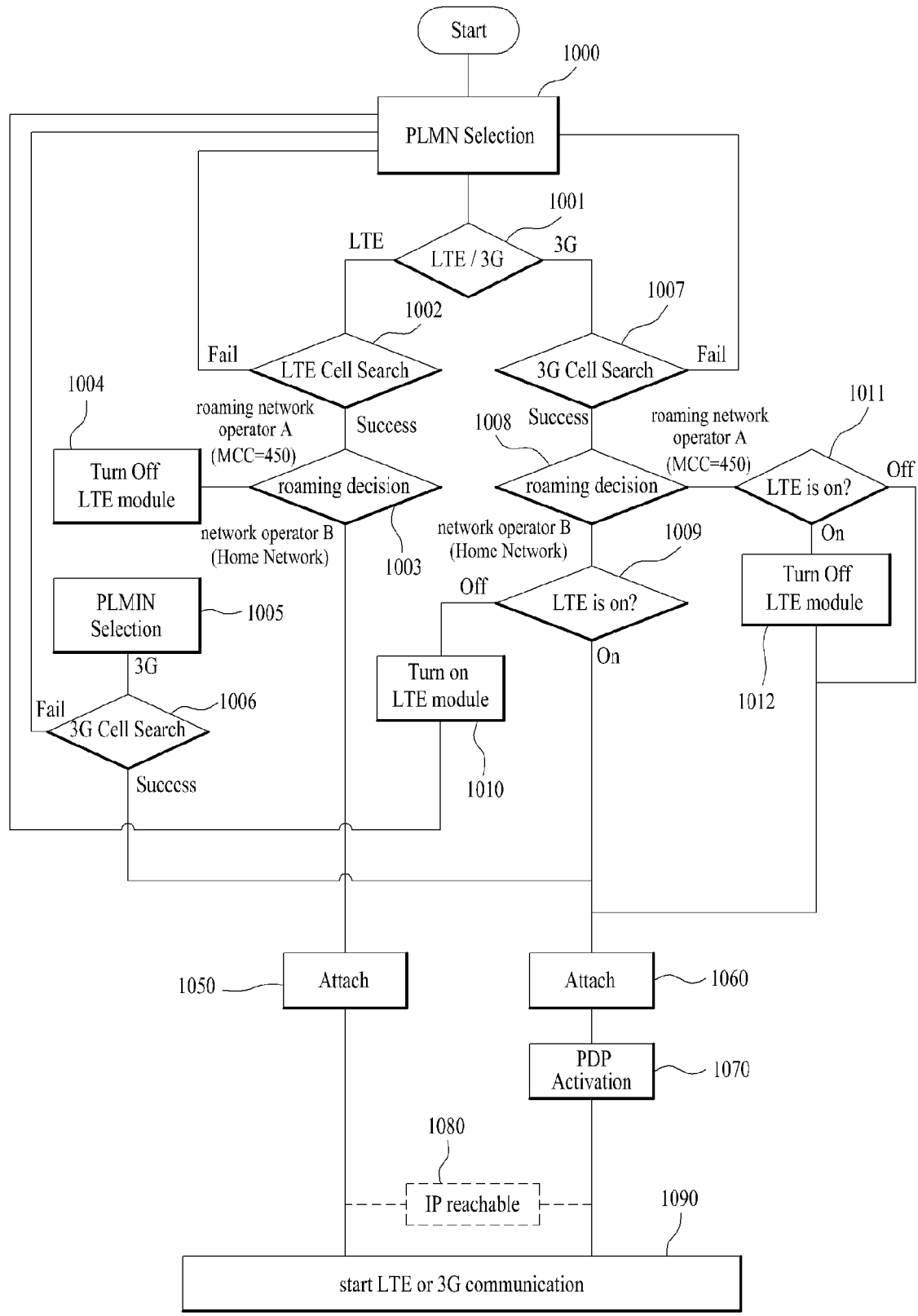
FIG. 10 is a flow chart illustrating a roaming procedure according to the present invention.

FIG. 10 is a flow chart illustrating a roaming procedure according to the present invention.

In FIG. 10, it is assumed that the dual mode user equipment can perform communication with a 3G network (UMTS network) and the LTE network and is the subscriber user equipment of the network operator that includes both the 3G network and the LTE network. It is also assumed that the network operator A includes the 3G network only, or includes the LTE network that is not compatible with the LTE network of the network operator B.

Referring to FIG. 10, if the user equipment is powered on, it performs the PLMN selection procedure described with reference to FIG. 6, at step 1000. Subsequently, the user equipment determines the priority order of cells for camp on at step 1001. In this embodiment, it is assumed that the LTE network of the cells for camp on is prior to the 3G network.

At step 1002, the user equipment determines whether the cell selected in the PLMN selection procedure is the LTE cell. If the cell is not the LTE cell, the user equipment returns to the step 1000 and again performs the PLMN selection procedure to select a new cell. If the LTE cell is selected, the user equipment determines whether access to the corresponding cell is roaming, at step 1003. Determination as to roaming follows the procedure illustrated in FIG. 7, and the MCC included in the PLMN ID or combination of the MCC and the MNC can be used. In other words, if MCC stored in the user equipment or combination of this MCC and MNC is the same as MCC detected in the PLMN selection procedure or combination of this MCC and MNC, since the user equipment is not roaming but accesses the home network, i.e., the LTE network of the network operator B, it performs a procedure of attaching to the LTE network of step 1050. The procedure of attaching to the LTE network will be described later.

Also, as a result of the step 1003, if MCC stored in the user equipment or combination of this MCC and MNC is not the same as MCC detected in the PLMN selection procedure or combination of this MCC and MNC, since the user equipment is roaming and trying access to the LTE network of the network operator A, which is not compatible with the LTE network of the network operator B, it turns off the LTE module at step 1004. Subsequently, the dual mode user equipment newly performs the PLMN selection procedure at step 1005, and determines whether the selected cell is the 3G network. If the user equipment fails to select the 3G network, it returns to the step 1000 and again tries the PLMN selection procedure. However, if the selected cell is the 3G network, the user equipment performs a procedure of attaching to the 3G network and a procedure of activating packet data protocol (PDP) context at steps 1060 and 1070. Likewise, the procedure of attaching to the 3G network and the procedure of activating PDP context will be described later.

In the mean time, in case of the cells for camp on, if the 3G network is prior to the LTE network, or if the cell of the 3G network should be selected after the cell of the LTE network is selected, the user equipment determines whether the cell selected in the PLMN selection procedure of the step 1000 is the 3G cell at step 1007. If the cell selected in the PLMN selection procedure of the step 1000 is not the 3G cell, the user equipment returns to the step 1000 and again performs the PLMN selection procedure to select a new cell. If the 3G cell is selected, the user equipment determines whether access to the corresponding cell is roaming, at step 1008. Likewise, determination as to roaming follows the procedure illustrated in FIG. 7, and the MCC included in the PLMN ID or combination of the MCC and the MNC can be used. In other words, if MCC stored in the user equipment or combination of this MCC and MNC is the same as MCC detected in the PLMN selection procedure or combination of this MCC and MNC, the user equipment is not roaming but accesses the home network, i.e., the 3G network of the network operator B. Accordingly, the user equipment again determines whether the LTE module is being operated, at step 1009. If the LTE module is not being operated, the user equipment turns on the LTE module at step 1010, and again performs the PLMN selection procedure of the step 1000. This is to try access to the LTE network having high priority as the user equipment is the subscriber of the network operator B and the network operator B includes both the LTE network and the 3G network. In particular, the step 1010 can be performed when the user equipment returns from the network of the network operator A to the network of the network operator B.

As a result of the step 1008, if MCC stored in the user equipment or combination of this MCC and MNC is not the same as MCC detected in the PLMN selection procedure or combination of this MCC and MNC, since the user equipment is roaming and trying access to the 3G network of the network operator A, it determines whether the LTE module is being operated, at step 1011. If the LTE module is being operated, the user equipment turns off the LTE module at step 1012. Afterwards, the user equipment performs the procedure of attaching to the 3G network and the procedure of activating packet data protocol (PDP) context at the steps 1060 and 1070.

In the mean time, the user equipment enters an IP reachable state like step 1080 through the step 1050 or the steps 1060 and 1070, and starts communication with the 3G network or the LTE network at step 1090. In this case, the IP reachable state means that the user equipment is allocated with IP address from the corresponding network and is able to provide a packet service.

Figure 11:
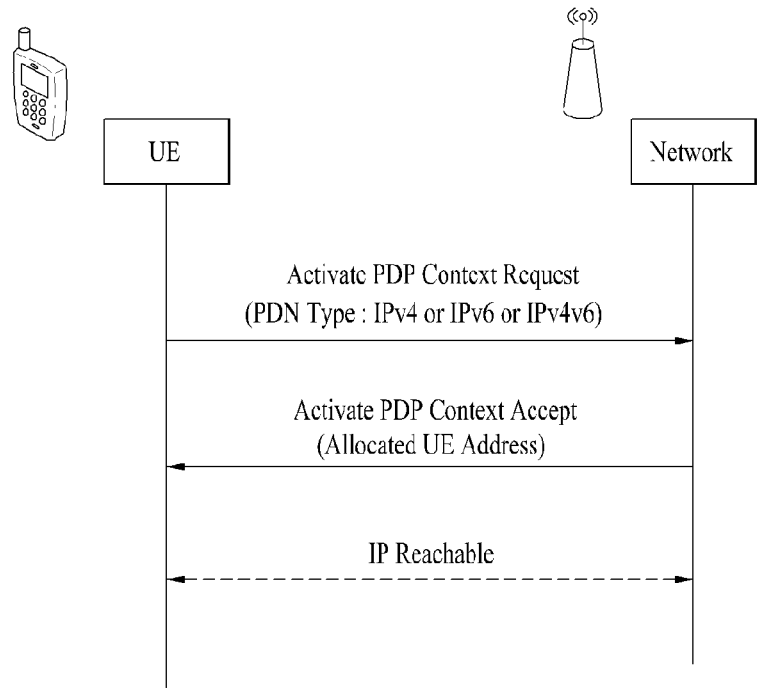
FIG. 11 is a diagram illustrating a procedure of entering an IP reachable state in each of a 3G network and an LTE network.
Figure 11:
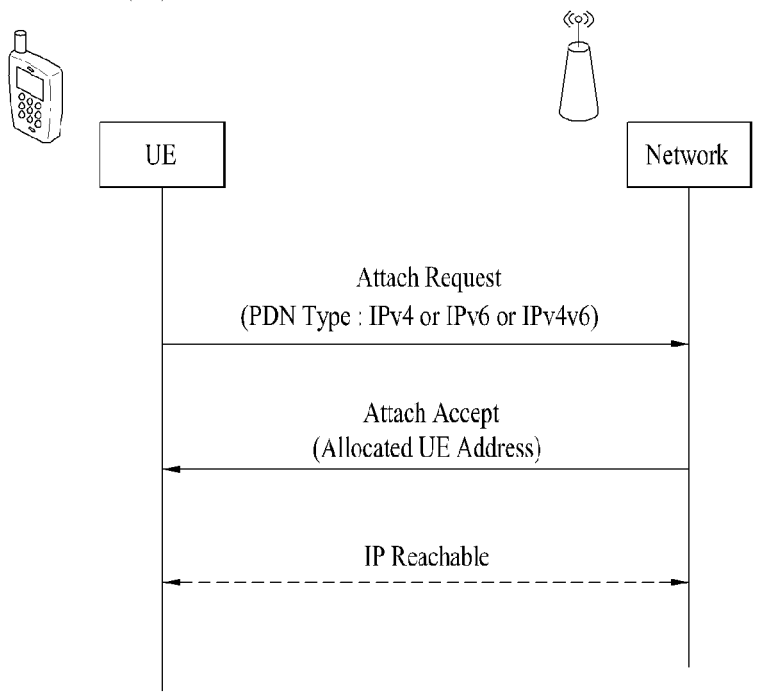

FIG. 11 is a diagram illustrating a procedure of entering an IP reachable state in each of a 3G network and an LTE network. In particular, (a) of FIG. 11 illustrates the procedure of activating the PDP context at the 3G network, and (b) of FIG. 11 illustrates the procedure of attaching to the LTE network. In other words, in order to reach the IP reachable state of the 3G network, the procedure of attaching to the 3G network and the procedure of activating the PDP context are required. However, in this embodiment, the two procedures of the LTE network are united to one, whereby the attaching procedure exists only.

In this case, the PDP context is aggregation of one or more kinds of information for connection to an external packet data network (PDN), and serves to provide connection between the user equipment and the network to transmit and receive packet data to and from each other.

Referring to (a) of FIG. 11, after completing the procedure of attaching to the 3G network, the user equipment transmits a PDP context activation request message to the 3G network. In particular, the PDP context activation request message defines a packet data network (PDN) type, and examples of the PDN type include IPv4, IPv6, and IPv3v6. The network that has received the PDP context activation request message transmits a PDP context activation grant message to the user equipment, wherein the PDP context activation grant message includes IP address allocated to the user equipment.

Also, referring to (b) of FIG. 11, the user equipment transmits an Attach request message to the LTE network. The Attach request message defines a packet data network (PDN) type, and examples of the PDN type include IPv4, IPv6, and IPv3v6. The network that has received the Attach request message transmits an Attach grant message to the user equipment, and the user equipment transmits an Attach complete message to the network in response to the Attach grant message. The Attach grant message includes IP address allocated to the user equipment.

In other words, after performing the procedure of (a) or (b) of FIG. 11, the user equipment enters the IP reachable state, whereby the user equipment is allocated with IP address from the corresponding network and is able to provide a packet service.

According to the present invention, the network operator can determine whether the LTE module is operated at a specific zone, by using MCC, etc. As a result, the network operator can provide a restrictive network service.

Figure 12:
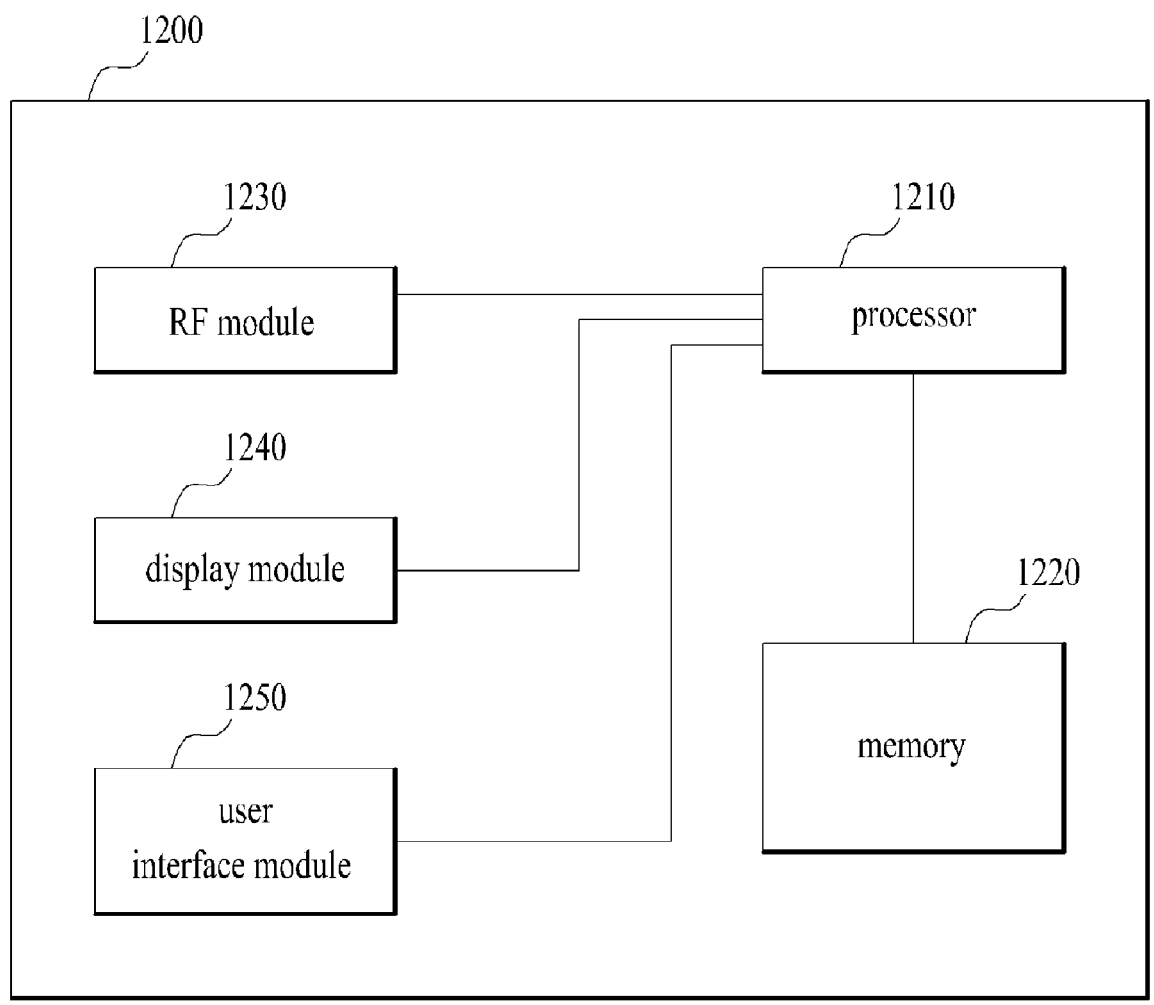
FIG. 12 is a block diagram illustrating a communication transceiver according to one embodiment of the present invention.

FIG. 12 is a block diagram illustrating a communication transceiver according to one embodiment of the present invention. The transceiver may be a part of the base station and the user equipment.

Referring to FIG. 12, the transceiver 1200 includes a processor 1210, a memory 1220, a radio frequency (RF) module 1230, a display module 1240, and a user interface module 1250.

The transceiver 1200 is illustrated for convenience of description, and some of its modules may be omitted. Also, the transceiver 1200 may further include necessary modules. Moreover, some modules of the transceiver 1200 may be divided into segmented modules. The processor 1210 is configured to perform the operation according to the embodiment of the present invention illustrated with reference to the drawings.

In more detail, if the transceiver 1200 is a part of the base station, the processor 1210 can generate a control signal and map the control signal into a control channel configured within a plurality of frequency blocks. Also, if the transceiver 1200 is a part of the user equipment, the processor 1210 can identify a control channel allocated thereto, through the signal received from the plurality of frequency blocks, and can extract the control signal from the control channel.

Afterwards, the processor 1210 can perform the necessary operation based on the control signal. For the detailed operation of the processor 1210, refer to the description illustrated in FIG. 1 to FIG. 11.

The memory 1220 is connected with the processor 1210 and stores an operating system, an application, a program code, and data therein. In particular, the memory 1220 can store the MNC and the MCC allocated to the user equipment, and can extract the MNC and the MCC to use them for determination as to roaming.

The RF module 1230 is connected with the processor 1210 and converts a baseband signal to a radio signal or vice versa. To this end, the RF module 1230 performs analog conversion, amplification, filtering and frequency uplink conversion, or their reverse processes. In particular, the RM module 1230 can perform communication with the UMTS network and the LTE network. The module related to each of the UMTS network and the LTE network may be implemented separately, or the UMTS network and the LTE network may be operated in one module.

The display module 1240 is connected with the processor 1210 and displays various kinds of information. Examples of the display module 1240 include, but not limited to, a liquid crystal display (LCD), a light emitting diode (LED), and an organic light emitting diode (OLED). The user interface module 1250 is connected with the processor 1210, and can be configured by combination of well known user interfaces such as keypad and touch screen.

The aforementioned embodiments are achieved by combination of structural elements and features of the present invention in a predetermined type. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment. Moreover, it will be apparent that some claims referring to specific claims may be combined with another claims referring to the other claims other than the specific claims to constitute the embodiment or add new claims by means of amendment after the application is filed.

The embodiments of the present invention have been described based on the data transmission and reception between the user equipment and the base station. A specific operation which has been described as being performed by the base station may be performed by an upper node of the base station as the case may be. In other words, it will be apparent that various operations performed for communication with the user equipment in the network which includes a plurality of network nodes along with the base station can be performed by the base station or network nodes other than the base station. The base station may be replaced with terms such as a fixed station, Node B, eNode B (eNB), and access point. Also, the user equipment may be replaced with terms such as a mobile station (MS) and a mobile subscriber station (MSS).

The embodiments according to the present invention can be implemented by various means, for example, hardware, firmware, software, or their combination. If the embodiment according to the present invention is implemented by hardware, the embodiment of the present invention can be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

If the embodiment according to the present invention is implemented by firmware or software, the embodiment of the present invention can be implemented by a type of a module, a procedure, or a function, which performs functions or operations described as above. A software code may be stored in a memory unit and then may be driven by a processor. The memory unit may be located inside or outside the processor to transmit and receive data to and from the processor through various means which are well known.

The present invention can be applied to a multi mode terminal. More specifically, the present invention can be applied to a method for restricting a communicating service in roaming in a multi mode terminal and an apparatus therefor.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for performing roaming in a dual mode terminal, which includes a first wireless communication module corresponding to a first communication network and a second wireless communication module corresponding to a second communication network, the method comprising:
    acquiring a public land mobile network (PLMN) identifier by camping on the first communication network;
    determining whether connection to the first communication network is roaming by comparing roaming decision information included in the PLMN identifier with roaming decision information stored in the dual mode terminal;
    turning off the second wireless communication module if it is determined that connection to the first communication network is roaming; and
    transmitting and receiving a signal to and from the first communication network.

2. The method of claim 1, wherein the roaming decision information is a mobile country code (MCC).

3. The method of claim 1, wherein the roaming decision information is combination of a mobile country code (MCC) and a mobile network code (MNC).

4. The method of claim 1, wherein the first communication network is a universal mobile telecommunications system (UMTS) communication network, and the second communication network is a long term evolution (LTE) communication network.

5. The method of claim 1, further comprising:
    determining whether the second wireless communication module is being operated if connection to the first communication network is not roaming; and
    resuming the operation of the second wireless communication module if the second wireless communication module is not being operated.

6. The method of claim 1, wherein a system providing a roaming service to the dual mode terminal includes the first communication network only.

7. A dual mode terminal in a wireless communication system, the dual mode terminal comprising:
    a first wireless communication module for transmitting and receiving a signal to and from a first communication network;
    a second wireless communication module for transmitting and receiving a signal to and from a second communication network;
    a memory module storing roaming decision information; and
    a processor processing the signal received from the first communication network and the signal received from the second communication network,
    wherein the processor acquires a public land mobile network (PLMN) identifier by camping on the first communication network, determines whether connection to the first communication network is roaming by comparing roaming decision information included in the PLMN identifier with roaming decision information stored in the dual mode terminal, and turning off the second wireless communication module if it is determined that connection to the first communication network is roaming.

8. The dual mode terminal of claim 7, wherein the roaming decision information is a mobile country code (MCC).

9. The dual mode terminal of claim 7, wherein the roaming decision information is combination of a mobile country code (MCC) and a mobile network code (MNC).

10. The dual mode terminal of claim 7, wherein the first communication network is a universal mobile telecommunications system (UMTS) communication network, and the second communication network is a long term evolution (LTE) communication network.

11. The dual mode terminal of claim 7, wherein the processor determines whether the second wireless communication module is being operated if connection to the first communication network is not roaming, and resumes the operation of the second wireless communication module if the second wireless communication module is not being operated.

12. The dual mode terminal of claim 7, wherein a system providing a roaming service to the dual mode terminal includes the first communication network only.

* * * * *

UNITED STATES PATENT AND TRADEMARK OFFICE
CERTIFICATE OF CORRECTION

| | | |
|---|---|---|
| PATENT NO. | : 8,301,136 B2 | |
| APPLICATION NO. | : 13/154534 | |
| DATED | : October 30, 2012 | |
| INVENTOR(S) | : Wooyol Kim et al. | |

It is certified that error appears in the above-identified patent and that said Letters Patent is hereby corrected as shown below:

ON THE TITLE PAGE:

At item (75), Inventors, change:

"Kazumasa Nitta, Tokyo (KR); Atsuto Miyata, Kanagawa (KR); Kazuoki Ichikawa, Tokyo (KR)"

to read:

--Kazumasa Nitta, Tokyo (JP); Atsuto Miyata, Kanagawa (JP); Kazuoki Ichikawa, Tokyo (JP)--.

Signed and Sealed this
Twenty-third Day of April, 2013

Teresa Stanek Rea
*Acting Director of the United States Patent and Trademark Office*